US012289572B2

(12) United States Patent
Ren et al.

(10) Patent No.: US 12,289,572 B2
(45) Date of Patent: Apr. 29, 2025

(54) ELECTRONIC DEVICE WITH A SOUNDING FUNCTION

(71) Applicant: AAC Microtech (Changzhou) Co., Ltd., Changzhou (CN)

(72) Inventors: Zhang Ren, Shenzhen (CN); Qi Wang, Shenzhen (CN); Zhiwei Zhong, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 245 days.

(21) Appl. No.: 18/089,583

(22) Filed: Dec. 28, 2022

(65) Prior Publication Data

US 2024/0073568 A1 Feb. 29, 2024

Related U.S. Application Data

(63) Continuation of application No. PCT/CN2022/125142, filed on Oct. 13, 2022.

(30) Foreign Application Priority Data

Aug. 30, 2022 (CN) ......................... 202222293368.4

(51) Int. Cl.
*H04R 1/02* (2006.01)
*H04R 9/06* (2006.01)

(52) U.S. Cl.
CPC ................. *H04R 1/02* (2013.01); *H04R 9/06* (2013.01); *H04R 2400/11* (2013.01)

(58) Field of Classification Search
None
See application file for complete search history.

(56) References Cited

U.S. PATENT DOCUMENTS

2016/0119718 A1* 4/2016 Yang ........................ H04R 1/24 381/351
2024/0040318 A1* 2/2024 Xu ......................... H04R 9/025

FOREIGN PATENT DOCUMENTS

CN 114845220 A * 8/2022

* cited by examiner

*Primary Examiner* — James K Mooney
(74) *Attorney, Agent, or Firm* — Wiersch Law Group

(57) ABSTRACT

Disclosed is an electronic device with a sounding function, including a shell structural member and a speaker. The speaker includes a first sounding unit used to emit low-frequency sounds and a second sounding unit used to emit high-frequency sounds that are coaxially arranged. The first sounding unit surrounds the second sounding unit. The shell structural member is provided with a first channel for transmitting the low-frequency sounds, a second channel separated from the first channel for transmitting the high-frequency sounds, and a common channel for communicating both the first and second channels with the outside of the electronic device. The second channel includes a front cavity of the second sounding unit and a connecting channel for communicating the front cavity with the common channel. The connecting channel is in a horn shape. The effect of the high-frequency sounds of the electronic device with a sounding function is improved.

4 Claims, 4 Drawing Sheets

A–A

ELECTRONIC DEVICE WITH A SOUNDING FUNCTION

FIELD OF THE PRESENT DISCLOSURE

The present disclosure relates to electroacoustic transducers, in particular to an electronic device with a sounding function.

DESCRIPTION OF THE RELATED ART

An electronic device with a sounding function in the related art includes a shell structural member and a speaker mounted on the shell structural member. The speaker includes a first sounding unit and a second sounding unit that are coaxially arranged. The first sounding unit surrounds the second sounding unit. The first sounding unit is used to emit low-frequency sounds, the second sounding unit is used to emit high-frequency sounds. The shell structural member is provided with a common acoustic channel for the first sounding unit and the second sounding unit. The low-frequency sounds emitted by the first sounding unit and the high-frequency sounds emitted by the second sounding unit are directly transmitted to the common acoustic channel and then to the outside of the electronic device. However, due to the limitation of the size of the speaker and the interaction between the high-frequency sounds and the low-frequency sounds, the effect of the high-frequency sounds is weakened, resulting in a short of the effect of the high-frequency sounds of the electronic device.

Thus, it is necessary to provide a novel electronic device with a sounding function to solve the problem.

SUMMARY

An objective of the present disclosure is to overcome the above technical problems and provide an electronic device with a sounding function of which the effect of the high-frequency sounds is improved.

In order to achieve the objective mentioned above, the present disclosure discloses an electronic device with a sounding function including a shell structural member and a speaker mounted on the shell structural member. The speaker includes a first sounding unit and a second sounding unit that are coaxially arranged. The first sounding unit surrounds the second sounding unit. The first sounding unit is used to emit low-frequency sounds. The second sounding unit is used to emit high-frequency sounds. The shell structural member is provided with an acoustic channel for transmitting sounds emitted by the speaker to the outside of the electronic device. The acoustic channel includes a first channel for transmitting the low-frequency sounds emitted by the first sounding unit, a second channel separated from the first channel for transmitting the high-frequency sounds emitted by the second sounding unit, and a common channel for communicating both the first channel and the second channel with the outside of the electronic device. The second channel includes a front cavity of the second sounding unit and a connecting channel for communicating the front cavity with the common channel. The connecting channel is in a horn shape.

As an improvement, the shell structural member includes a middle frame and a screen covering the middle frame. The middle frame and the screen form the acoustic channel together.

As an improvement, the middle frame includes a main body wall on which the speaker is mounted and a side wall connected to the main body wall and located on a side of the speaker. The main body wall includes a supporting part extending in a direction away from the screen. The speaker further includes a first frame and a second frame. The first frame surrounds the second frame. The first sounding unit is arranged between the first frame and the second frame. The second sounding unit is arranged on an inner side of the second frame. The first frame is fixed to the supporting part. The main body wall further includes a first through hole over the first sounding unit, a second through hole over the second sounding unit, and a dividing wall separating the first through hole and the second through hole. The dividing wall includes an enclosing wall forming the front cavity. The second frame is fixed to the enclosing wall. The enclosing wall is provided with a gap. The dividing wall further includes a pair of extension walls opposite to and spaced apart from each other and extending from the gap in a direction away from the enclosing wall. The pair of extension walls form the connecting channel A spacing distance between the pair of extension walls gradually increases from the gap in the direction away from the enclosing wall.

As an improvement, the common channel includes a first part formed between the screen and the main body wall and a second part formed in the side wall. A mesh is arranged between the first part and the second part.

As an improvement, the speaker further includes a magnetic circuit system. The first frame and the second frame are fixed to the magnetic circuit system. The magnetic circuit system is provided with a first magnetic gap and a second magnetic gap. The first sounding unit includes a first diaphragm and a first voice coil driving the first diaphragm for vibrating and emitting the low-frequency sounds. The second sounding unit includes a second diaphragm and a second voice coil driving the second diaphragm for vibrating and emitting the high-frequency sounds. The first voice coil locates in the first magnetic gap. The second voice coil locates in the second magnetic gap.

In the electronic device with a sounding function according to the present disclosure, the acoustic channel includes the first channel for transmitting the low-frequency sounds emitted by the first sounding unit, the second channel separated from the first channel for transmitting the high-frequency sounds emitted by the second sounding unit, and the common channel for communicating both the first channel and the second channel with the outside of the electronic device, the second channel includes the front cavity of the second sounding unit and the connecting channel for communicating the front cavity with the common channel, and the connecting channel is in a horn shape, the low-frequency sounds emitted by the first sounding unit and the high-frequency sounds emitted by the second sounding unit pass through their own separate channels first, and then converge in the common channel, meanwhile, the high-frequency sounds emitted by the second sounding unit can be amplified by the front cavity and the horn-shaped connecting channel when passing through the second channel, thereby improving the effect of the high-frequency sounds, and ensuring the smooth transmission of the low-frequency sounds emitted by the first sounding unit as possible.

BRIEF DESCRIPTION OF THE DRAWINGS

In order to more clearly illustrate the technical solutions in embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art based on the accompanying drawings without creative efforts, wherein.

DETAILED DESCRIPTION OF THE EMBODIMENTS

The technical solutions in embodiments of the present disclosure will be described clearly and completely below with reference to the accompanying drawings in the embodiments of the present disclosure. It is apparent that, the described embodiments are merely some of rather than all of the embodiments of the present disclosure. All other embodiments acquired by those of ordinary skill in the art without creative efforts based on the embodiments of the present disclosure shall fall within the protection scope of the present disclosure.

Figure 1:
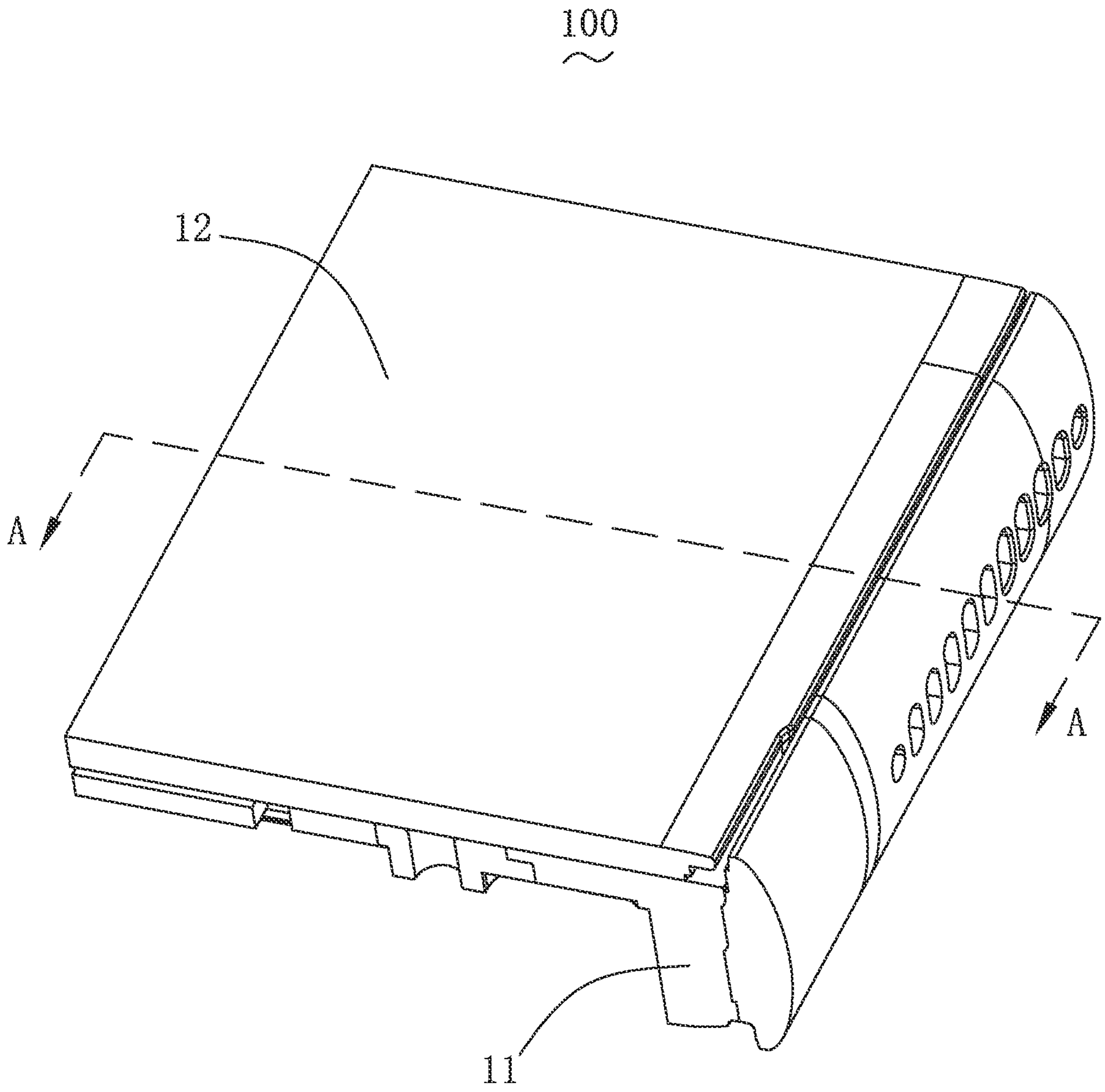
FIG. 1 is an isometric view of part of an electronic device with a sounding function in accordance with an exemplary embodiment of the present disclosure.
Figure 2:
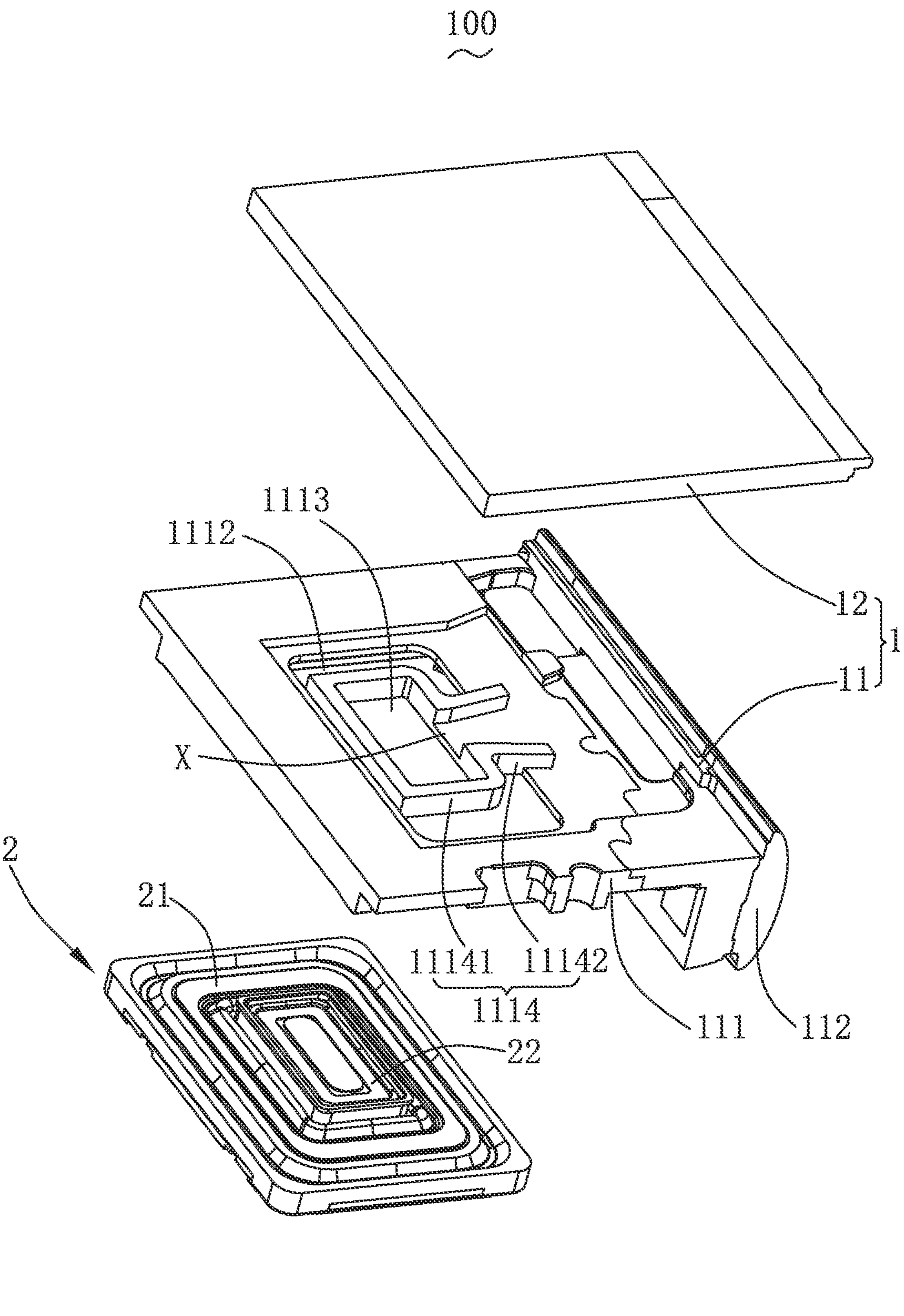
FIG. 2 is an exploded view of part of the electronic device with a sounding function in FIG. 1.
Figure 3:
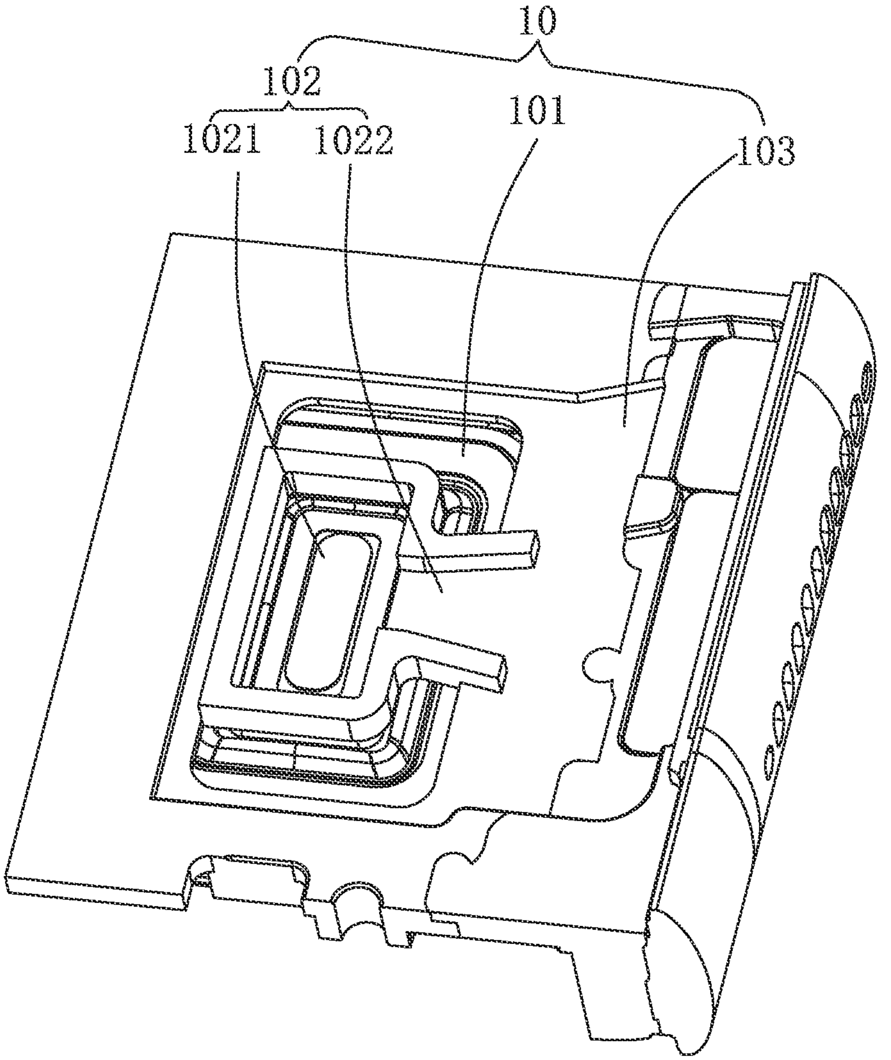
FIG. 3 is an isometric view of part of the electronic device with a sounding function in FIG. 1, removing a screen.
Figure 4:
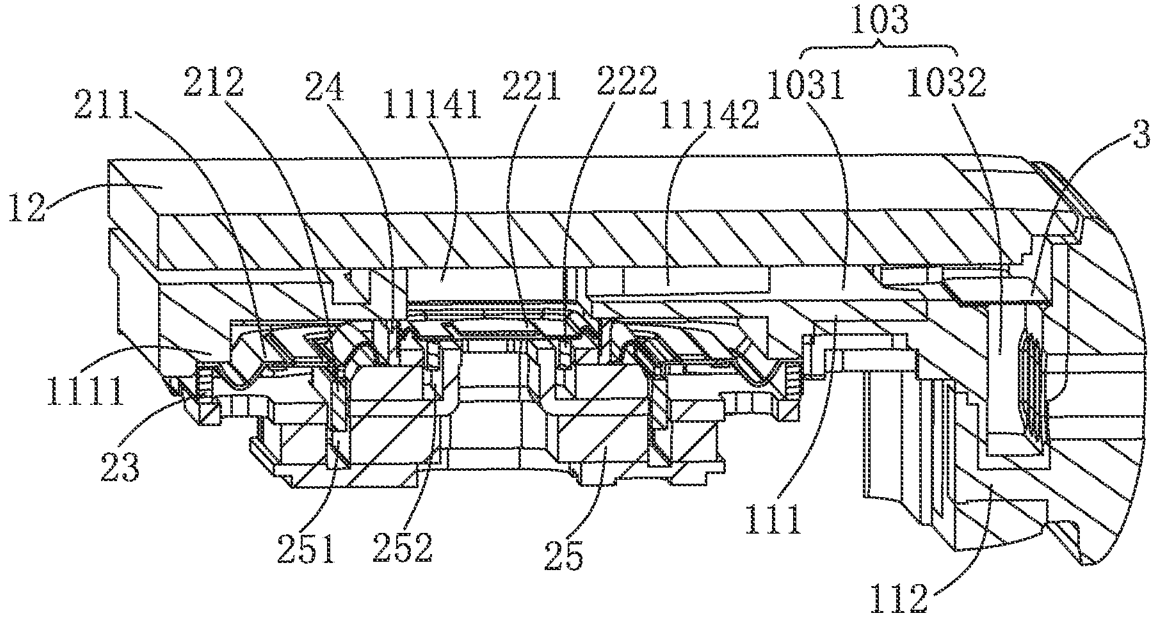
FIG. 4 is a cross-sectional view of part of the electronic device with a sounding function, taken along line A-A in FIG. 1.

Referring to FIGS. 1-4, the present disclosure discloses an electronic device 100 with a sounding function including a shell structural member 1 and a speaker 2 mounted on the shell structural member 1. The electronic device 100 with a sounding function may be a cell phone, a tablet computer, and the like.

The speaker 2 includes a first sounding unit 21 and a second sounding unit 22 that are coaxially arranged. The first sounding unit 21 surrounds the second sounding unit 22. The first sounding unit 21 is used to emit low-frequency sounds. The second sounding unit 22 is used to emit high-frequency sounds.

The shell structural member 1 is provided with an acoustic channel 10 for transmitting sounds emitted by the speaker 2 to the outside of the electronic device 100. The acoustic channel 10 includes a first channel 101 for transmitting the low-frequency sounds emitted by the first sounding unit 21, a second channel 102 separated from the first channel 101 for transmitting the high-frequency sounds emitted by the second sounding unit 22, and a common channel 103 for communicating both the first channel 101 and the second channel 102 with the outside of the electronic device 100. Optionally, the shell structural member 1 includes a middle frame 11 and a screen 12 covering the middle frame 11. The middle frame 11 and the screen 12 form the acoustic channel 10 together.

The second channel 102 includes a front cavity 1021 of the second sounding unit 22 and a connecting channel 1022 for communicating the front cavity 1021 with the common channel 103. The connecting channel 1022 is in a horn shape.

The middle frame 11 includes a main body wall 111 on which the speaker 2 is mounted and a side wall 112 connected to the main body wall 111 and located on a side of the speaker 2. The main body wall 111 includes a supporting part 1111 extending in a direction away from the screen 12. The speaker 2 further includes a first frame 23 and a second frame 24. The first frame 23 surrounds the second frame 24. The first sounding unit 21 is arranged between the first frame 23 and the second frame 24. The second sounding unit 22 is arranged on an inner side of the second frame 24. The first frame 23 is fixed to the supporting part 1111. The main body wall 111 further includes a first through hole 1112 over the first sounding unit 21, a second through hole 1113 over the second sounding unit 22, and a dividing wall 1114 separating the first through hole 1112 and the second through hole 1113. The dividing wall 1114 includes an enclosing wall 11141 forming the front cavity 1021. The second frame 24 is fixed to the enclosing wall 11141. The enclosing wall 11141 is provided with a gap X. The dividing wall 1114 further includes a pair of extension walls 11142 opposite to and spaced apart from each other and extending from the gap X in a direction away from the enclosing wall 11141. The pair of extension walls 11142 form the connecting channel 1022. A spacing distance between the pair of extension walls 11142 gradually increases from the gap X in the direction away from the enclosing wall 11141.

The common channel 103 includes a first part 1031 formed between the screen 12 and the main body wall 111 and a second part 1032 formed in the side wall 112. A mesh 3 is arranged between the first part 1031 and the second part 1032.

The speaker 2 further includes a magnetic circuit system 25. The first frame 23 and the second frame 24 are fixed to the magnetic circuit system 25. The magnetic circuit system 25 is provided with a first magnetic gap 251 and a second magnetic gap 252. The first sounding unit 21 includes a first diaphragm 211 and a first voice coil 212 driving the first diaphragm 211 for vibrating and emitting the low-frequency sounds. The second sounding unit 22 includes a second diaphragm 221 and a second voice coil 222 driving the second diaphragm 221 for vibrating and emitting the high-frequency sounds. The first voice coil 212 locates in the first magnetic gap 251. The second voice coil 222 locates in the second magnetic gap 252.

In the electronic device with a sounding function according to the present disclosure, the acoustic channel includes the first channel for transmitting the low-frequency sounds emitted by the first sounding unit, the second channel separated from the first channel for transmitting the high-frequency sounds emitted by the second sounding unit, and the common channel for communicating both the first channel and the second channel with the outside of the electronic device, the second channel includes the front cavity of the second sounding unit and the connecting channel for communicating the front cavity with the common channel, and the connecting channel is in a horn shape, the low-frequency sounds emitted by the first sounding unit and the high-frequency sounds emitted by the second sounding unit pass through their own separate channels first, and then converge in the common channel, meanwhile, the high-frequency sounds emitted by the second sounding unit can be amplified by the front cavity and the horn-shaped connecting channel when passing through the second channel, thereby improving the effect of the high-frequency sounds, and ensuring the smooth transmission of the low-frequency sounds emitted by the first sounding unit as possible.

The above are only embodiments of the present disclosure. It should be pointed out that those of ordinary skill in the art may also make improvements without departing from the ideas of the present disclosure, all of which fall within the protection scope of the present disclosure.

What is claimed is:

1. An electronic device with a sounding function, comprising:

a shell structural member; and a speaker mounted on the shell structural member, wherein the speaker comprises a first sounding unit and a second sounding unit that are coaxially arranged, the first sounding unit surrounds the second sounding unit, the first sounding unit is used to emit low-frequency sounds, the second sounding unit is used to emit high-frequency sounds, the shell structural member is provided with an acoustic channel for transmitting sounds emitted by the speaker to the outside of the electronic device, the acoustic channel comprises a first channel for transmitting the low-frequency sounds emitted by the first sounding unit, a second channel separated from the first channel for transmitting the high-frequency sounds emitted by the second sounding unit, and a common channel for communicating both the first channel and the second channel with the outside of the electronic device, the second channel comprises a front cavity of the second sounding unit and a connecting channel for communicating the front cavity with the common channel, the connecting channel is in a horn shape, the shell structural member comprises a middle frame and a screen covering the middle frame, the middle frame and the screen form the acoustic channel together.

2. The electronic device with a sounding function as described in claim 1, wherein the middle frame comprises a main body wall on which the speaker is mounted and a side wall connected to the main body wall and located on a side of the speaker, the main body wall comprises a supporting part extending in a direction away from the screen, the speaker further comprises a first frame and a second frame, the first frame surrounds the second frame, the first sounding unit is arranged between the first frame and the second frame, the second sounding unit is arranged on an inner side of the second frame, the first frame is fixed to the supporting part, the main body wall further comprises a first through hole over the first sounding unit, a second through hole over the second sounding unit, and a dividing wall separating the first through hole and the second through hole, the dividing wall comprises an enclosing wall forming the front cavity, the second frame is fixed to the enclosing wall, the enclosing wall is provided with a gap, the dividing wall further comprises a pair of extension walls opposite to and spaced apart from each other and extending from the gap in a direction away from the enclosing wall, the pair of extension walls form the connecting channel, a spacing distance between the pair of extension walls gradually increases from the gap in the direction away from the enclosing wall.

3. The electronic device with a sounding function as described in claim 2, wherein the common channel comprises a first part formed between the screen and the main body wall and a second part formed in the side wall, a mesh is arranged between the first part and the second part.

4. The electronic device with a sounding function as described in claim 2, wherein the speaker further comprises a magnetic circuit system, the first frame and the second frame are fixed to the magnetic circuit system, the magnetic circuit system is provided with a first magnetic gap and a second magnetic gap, the first sounding unit comprises a first diaphragm and a first voice coil driving the first diaphragm for vibrating and emitting the low-frequency sounds, the second sounding unit comprises a second diaphragm and a second voice coil driving the second diaphragm for vibrating and emitting the high-frequency sounds, the first voice coil located in the first magnetic gap, the second voice coil located in the second magnetic gap.

* * * * *